United States Patent [19]

Nagahara et al.

[11] 4,441,691

[45] Apr. 10, 1984

[54] HOISTING WINCH MOUNTED ON CRANE OR THE LIKE

[75] Inventors: Hiroshi Nagahara; Tosio Uchimura, both of Komatsu, Japan

[73] Assignee: Kabushiki Kaisha Komatsu Seisakusho, Tokyo, Japan

[21] Appl. No.: 341,752

[22] Filed: Jan. 22, 1982

[51] Int. Cl.³ .......................... B66D 1/22; B66D 5/14; B66D 5/22

[52] U.S. Cl. ..................................... 254/344; 74/789; 254/356

[58] Field of Search .............. 254/344, 356, 361, 297; 74/789, 790

[56] References Cited

U.S. PATENT DOCUMENTS

| | | | |
|---|---|---|---|
| 3,055,237 | 9/1962 | Magnuson | 74/789 |
| 3,319,492 | 5/1967 | Magnuson | 254/344 X |
| 3,519,247 | 7/1970 | Christison | 254/344 |
| 3,780,990 | 12/1973 | Edlund et al. | 254/361 |
| 4,185,520 | 1/1980 | Henneman et al. | 254/344 X |
| 4,227,680 | 10/1980 | Hrescak | 254/344 |

*Primary Examiner*—John M. Jillions
*Attorney, Agent, or Firm*—Armstrong, Nikaido, Marmelstein & Kubovcik

[57] ABSTRACT

A hoisting winch for cranes or the like having a power transmission system assembled in a final reduction drive of the winch and arranged such that arresting of the whole planetary gear set meshing with a ring gear connected to a spooling drum and releasing of the arrest can be effected by arresting a carrier and by releasing the arrest and that a rotary drive power from an input shaft is transmitted to the spooling drum when the carrier is held against rotation, brake means adapted to be spring applied and hydraulically released with its control circuit to arrest or release the carrier, and an adjustable pressure reducing valve provided in the control circuit for adjusting and controlling a braking force of the brake means.

3 Claims, 3 Drawing Figures

HOISTING WINCH MOUNTED ON CRANE OR THE LIKE

BACKGROUND OF THE INVENTION

This invention relates to a hoisting winch mounted on a crane or the like, and more particularly to a winch device assembled in the final reduction drive for a spooling drum on a winch and in which when a load which has been hoisted thereby is lowered, free rotation (or idle run) of the spooling drum is controlled by the frictional braking force adjusted by the operator to the degree he desires.

In the past, as disclosed in the U.S. Pat. No. 3,519,247, there has been known a winch device comprising a plurality of spring-applied and hydraulically released frictional disk brakes which, when actuated, arrest rotation of a ring gear and a planetary gear system having a carrier or spider located so as to mesh with the ring gear and connected with a spooling drum of the winch.

According to the winch disclosed in the U.S. Pat. No. 3,519,247, the hoisted load can be lowered by releasing the braking force which holds the ring gear against rotation. Stating in brief, even when the planetary gear system is being rotated by the power transmitted by a prime mover in the same direction as that for hoisting, the spooling drum is permitted to rotate by the weight of the load carried by the crane in the opposite direction to that for hoisting, provided that the braking force applied on the ring gear is released. The carrier connected with the spooling drum is also rotated in the same direction as that of rotation of the spooling drum. When the arresting force on the ring gear is released, the ring gear itself is rotated by the rotation of the planet gear. Accordingly, the rotation of the ring gear will counteract the rotation of the carrier in the direction for hoisting which occurs when the ring gear is arrested, and therefore the spooling drum is allowed to rotate freely by the load carried by the crane in the opposite direction to that for hoisting. Further, in order to control the free rotation of the spooling drum, a metering hydraulic pump is provided which meshes directly with the ring gear and the pressurized fluid delivered by which is utilized to adjust the braking force which arrests rotation of the ring gear.

In the winch device cited above, there is disclosed control by means of the metering pump as means for adjusting the frictional braking force of the disk brake in proportion to the speed of rotation of the ring gear. However, since this metering pump is mounted on the peripheral surface of the casing so as to project out in the radial direction, the structure of the device is not compact. Further it is troublesome to position the pump because of the need for directly engaging a drive pinion of the pump with the ring gear. In addition, in this prior art device, it is difficult to perform a fine control operation, because a control circuit thereof including the metering pump is too simple. Particularly, in this winch device, there is no difficulty encountered in case of simple operations such as hoisting the load and lowering the same by means of a single crane. However, when fine and complicated operations are required as in the case of hoisting and lowering a load by means of two sets of cranes used in such a manner as to cooperate with each other, it has been difficult to adjust quickly the frictional braking force to the degree that the operator desires.

SUMMARY OF THE INVENTION

The present invention has been contemplated in the abovementioned circumstances in the prior art and has for its object to provide a winch device capable of quickly adjusting the frictional braking force to the degree the operator desires.

To achieve this object, according to the present invention, there is provided a hoisting winch for cranes or the like, characterized by that it comprises a power transmission system assembled in a final reduction drive of the winch, said transmission system being arranged such that arresting of the whole planetary gear set meshing with a ring gear connected to a spooling drum of the winch and releasing of the arrest can be effected by arresting a carrier and by releasing the arrest of the carrier and that the rotary drive power from an input shaft is transmitted to the spooling drum when said carrier is held against rotation, brake means mounted in the final reduction drive and adapted to be spring-applied and hydraulically released to arrest and release said carrier, means driven by said carrier so as to govern the brake releasing fluid pressure in proportion to the speed of rotation of said carrier, and an adjustable pressure reducing valve adapted to supply the pressurized fluid delivered by a hydraulic pump driven by a prime mover into said brake means thereby releasing the braking force and reducing and controlling the pressurized fluid directed into said brake means by the action of said means driven by the rotation of said carrier.

BRIEF DESCRIPTION OF DRAWINGS

These and other objects, features and advantages of the present invention will appear and be understood in the course of the following description and claims, the invention consisting in the novel construction and in the adaptation and combination of parts hereinafter described and claimed in the accompanying drawings in which:

DETAILED DESCRIPTION OF THE INVENTION

Figure 1:
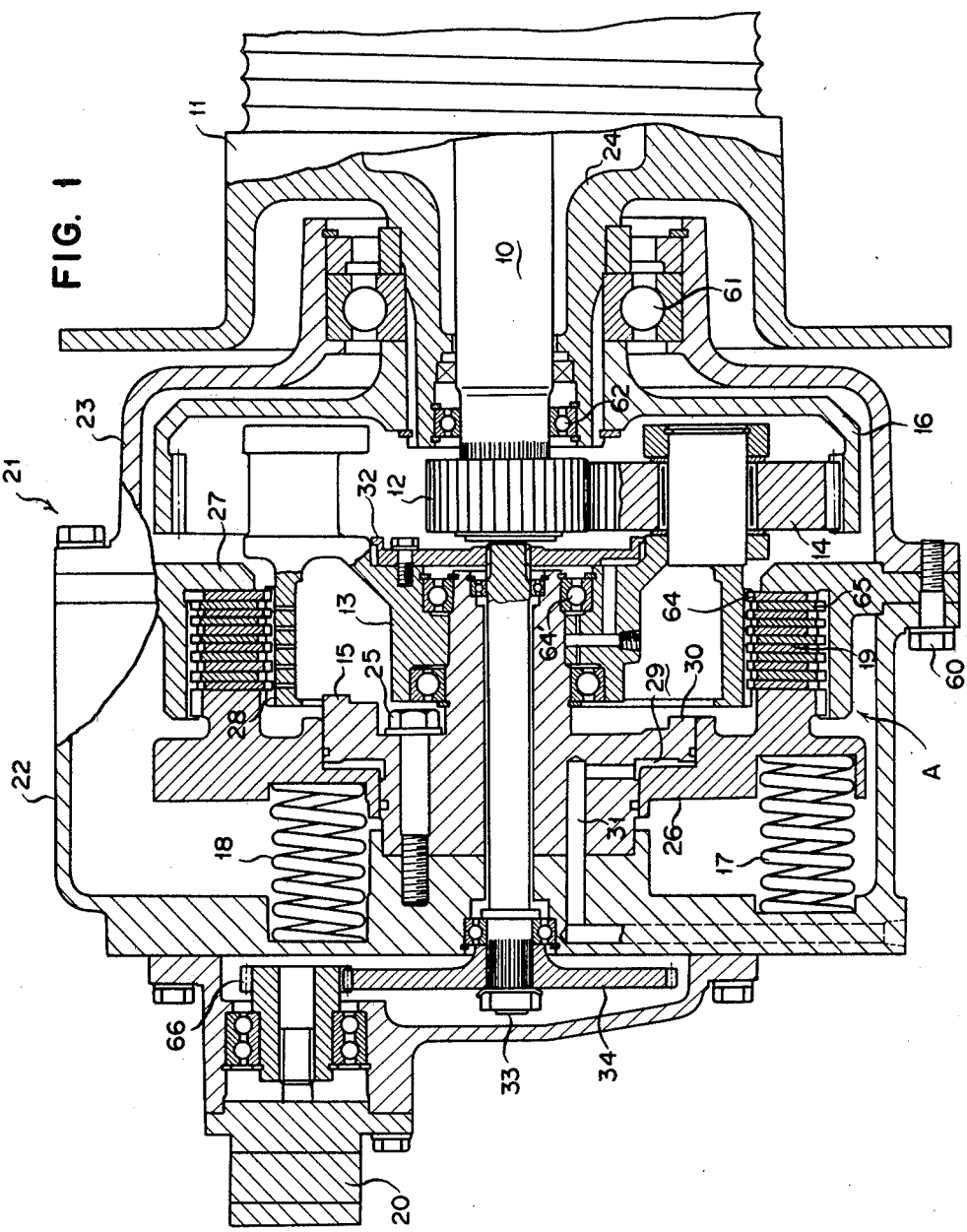
FIG. 1 is a fragmentary longitudinal vertical sectional view illustrating a final reduction drive embodying preferred teachings of the present invention.

With reference to FIG. 1, reference numeral 21 denotes a final reduction drive for use in a hydraulic winch. Further, reference numerals 22 and 23 denotes casings for the final reduction drive interconnected by means of bolts 60. A spooling drum 11 of the winch is carried through a bearing 61 by the journal part of the casing 23. In the central journal part of the spooling drum 11 there is provided an input shaft 10 extending through a bearing 62. The input shaft 10 is fitted with a sun gear 12. Fixedly secured to the aforementioned spooling drum 11 is a ring gear 16.

The other casing 22 has a support member 15 fixedly secured thereto. Rotatably mounted on the support member 15 through a bearing 64' is a carrier 13 of a planetary gear system. A planetary gear 14 is journaled by the carrier 13 and meshes with the aforementioned sun gear 12 and ring gear 16.

The aforementioned carrier 13 serves as an inner shell of a spring-applied and hydraulically released brake arrangement "A" (Referred simply to as negative brake hereinafter). An outer shell 27 of the negative brake is fixedly secured to the casing 22. This negative brake arrangement "A" comprises a plurality of disk plates 64 connected by a spline in the outer periphery of the carrier 13 serving as the inner shell and a plurality of disk plates 65 connected by a spline in the inner periphery of the outer shell 27 and interposed between each of the disk plates 64. The disk plates 64 and 65 are frictionally engaged with one another by the action of a pressure plate 26 which is slidably mounted on the support member 15 and which is biased by the resilient force of a spring 18 thereby actuating the brake. Further, defined between the pressure plate 26 and the support member 15 is a hydraulic cylinder chamber 29 arranged to slidably move the pressure plate 26 against the biasing force of the spring 18 so as to release the frictional engagement between the disk plates 64 and 65 to thereby release the braking force.

Further, the support member 15 has a power transmission shaft 33 which extends axially and centrally thereby and which is rotatably mounted thereon. The transmission shaft 33 is spline-connected, at one end thereof, with a connection plate 32 fixedly secured to the inner periphery of the carrier 13 and has at the other end thereof a gear 34 fixedly secured thereto. The gear 34 engages with a pinion 66 arranged on the power inlet side of a conventional type hydraulic pump 20 fixedly secured to the casing 22.

The supply of pressurized fluid into the aforementioned hydraulic cylinder chamber 29 will now be described with reference to the circuit diagram shown in FIG. 2.

Figure 2:
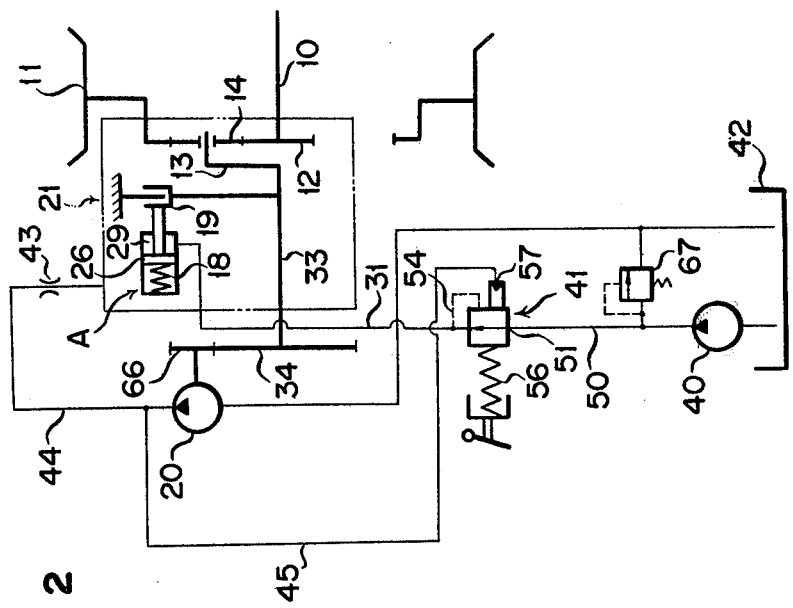
FIG. 2 is a schematic view illustrating a hydralic circuit including an adjustable pressure reducing valve for the multi-disk brake and FIG. 3 is a fragmentary vertical sectional view illustrating the adjustable pressure reducing valve.

In FIG. 2, reference numeral 40 denotes a hydraulic pump, and 41 an adjustable pressure reducing valve. The hydraulic pump 40 serves to supply pressurized fluid through the adjustable pressure reducing valve 41 into the negative brake releasing hydraulic cylinder chamber 29. On the other hand, the pressurized fluid delivered by the hydraulic pump 20 which is adapted to rotate with the rotation of the carrier to generate a fluid pressure is supplied into a lubrication circuit 44 having a restrictor 43 extending to the final reduction drive 21 and a pressure reducing control circuit 45 of the adjustable pressure reducing valve 41.

Figure 3:
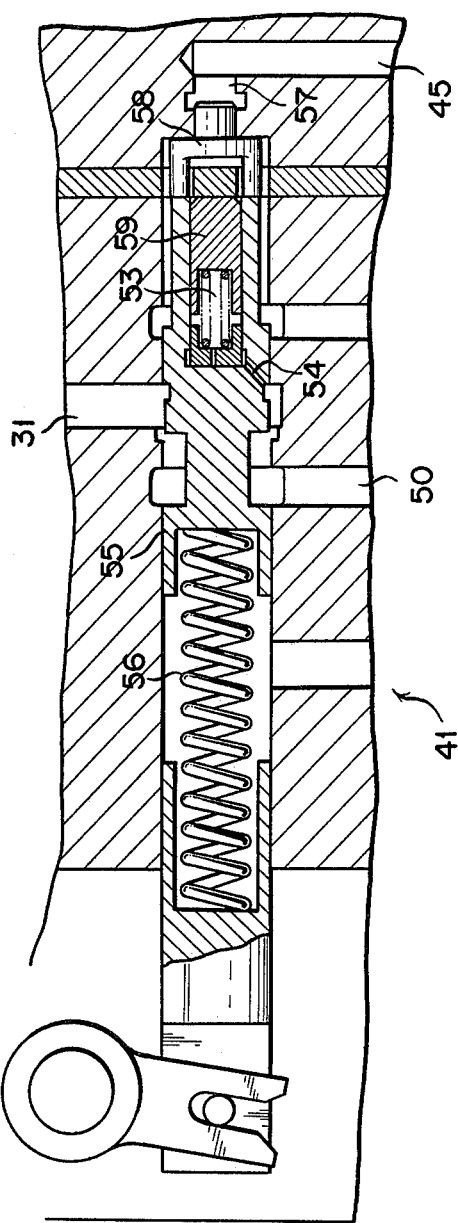

The adjustable pressure reducing valve 41 comprises, as shown in FIG. 3, an inlet port 51 connected to a passage 50 for fluid under pressure delivered from the hydraulic pump 40 driven by a prime mover, a pressure reducing control chamber 53 accommodating a load piston 59 to reduce and control the secondary pressure on the side of a brake releasing pressurized fluid passage 31 leading to said hydraulic cylinder chamber 29, a pilot passage 54 for introducing the pressurized fluid into the pressure reducing control chamber 53, an inlet port 57 connected to said pressure reducing control circuit 45 for allowing the pressurized fluid delivered by the hydraulic pump 20 to exert pressure through the load piston 58 on a valve spool 55, and an adjustable pressure reducing valve spool 55 spring 56 mounted on the opposite side of the load relative to the load piston 58 and manually operable for adjusting the pressure reducing control of the adjustable pressure reducing valve.

The operation of the winch device according to the present invention will now be described below.

To hoist a load suspended through a wire rope from the spooling drum 11, the input shaft 10 is rotated by a prime mover so as to rotate the sun gear 12. As a result, the planet gear 14 meshing with the sun gear 12 is rotated. If the negative brake "A" is rendered operative at that time, then the carrier 13 is arrested and the ring gear 16 is rotated by the rotation of the planet gear 14 so that the spool drum 11 can be rotated for hoisting the load.

When lowering the load hoisted by the spooling drum 11 and carried by a crane or the like at a proper position in a work site, it is desirable for the operator to make it possible to lower the load at a controlled speed, to increase the lowering speed of the load and to quickly apply a braking force on the load being lowered in such a magnitude as desired.

The pressurized fluid introduced through the pilot passage 54 of the adjustable pressure reducing valve 41 into the pressure reducing control chamber 53 will shift the valve spool 55 against the resilient force of the adjustable pressure reducing load spring 56 so as to reduce or control the pressurized fluid flow into the brake releasing pressurized fluid passage 31 thereby preventing the high pressure fluid for releasing the brake from flowing into the passage 31. Therefore, under such a condition as described hereinbefore, the pressurized fluid discharged by the hydraulic pump 40 is relieved by a main relief valve 67 installed in the passage 50.

The pressure reducing control pressure within the control chamber 53 of the aforementioned adjustable pressure reducing valve 41 can be varied as desired by manually adjusting the resilient force of the adjustable pressure reducing load spring 56. Stating in brief, by increasing the pushing force by the operator's hand to contract the load spring 56, the pressure reducing control pressure within the control chamber 53 can be increased. Thus, a secondary high pressure can be introduced into the brake releasing pressurized fluid passage 31 so that the negative brake can be released. By the release of the negative brake, the carrier 13 is rendered rotatable and is subject to a turning force or torque in the opposite direction to that of the rotation of the spooling drum 11 for hoisting, the torque being generated by the planet gear driving power transmitted by the input shaft 10 and through the sun gear 12. As soon as the carrier 13 is released from its restraint or arrested condition, the spooling drum 11 which has been prevented from rotating in the opposite direction to the direction of hoisting by the carrier 13 being arrested will become able to rotate freely or run idly by the action of the gravitational force exerted on the load hung by the crane even if it is being rotated or driven in the direction for hoisting by the input shaft 10. Therefore, when it is desired to lower the load hung thereby at a speed near the free fall thereof, the fluid pressure within the brake releasing hydraulic cylinder chamber 29 must be controlled so that the frictional braking force exerted between the disk plates 64 and 65 of the negative brake "A" can be adjusted to such a degree as the operator demands.

For the purpose of controlling the fluid pressure within the hydraulic cylinder chamber 29, there is provided the hydraulic pump 20 driven by the rotation of the carrier 13. Stating in brief, based on the principle that in proportion to changes in the frictional braking force of the negative brake the speed of rotation of the carrier will vary and hence that of the hydraulic pump 20 will vary, a change in the frictional braking force of the brake means will result in the corresponding change in the fluid pressure delivered by the hydraulic pump 20.

The pressurized fluid discharged by the hydraulic pump 20 is introduced through the circuit 45 into the inlet port 57 and is exerted through the load piston 58 on the valve spool 55 of the adjustable pressure reducing valve 41 set by the adjustable pressure reducing load spring 56. Consequently, the balance between the fluid pressure within the pressure reducing control chamber 53 and the load of the adjustable pressure reducing load spring 56 becomes unable to be maintained and therefore the valve spool 55 is moved leftwardly thereby restricting or preventing the brake releasing pressurized fluid flow into the passage 31 and controlling the lowering speed of the load hung by the crane.

According to the winch device of the present invention, it becomes possible for the operator by gradually increasing the load exerted on the adjustable pressure reducing load spring 56 by means of his hand to lower the load carried by the crane and which is arrested from lowering at a controlled speed and further increase the lowering speed thereof.

It is to be understood that the foregoing description is merely illustrative of a preferred embodiment of the invention, and that the scope of the invention is not to be limited thereto, but is to be determined by the scope of the appended claims.

What is claimed is:

1. A hoisting winch for cranes or the like comprising:
    a spooling drum,
    an input shaft,
    a final reduction drive system interconnecting said input shaft to said spooling drum, said drive system including:
    a casing;
    a planetary gear system in the casing having a sun gear connected to said input shaft, planet gears engaging said sun gear, a carrier rotatably carrying said planet gears, and a ring gear engaging said planet gears and being connected to said spooling drum;
    brake means mounted in the casing adapted to be spring applied and hydraulically released to arrest or release said carrier;
    means driven by said carrier for governing brake releasing fluid pressure in proportion to the speed of rotation of said carrier; and
    a manually adjustable pressure reducing valve means for supplying pressurized fluid delivered by a hydraulic pump by a prime mover into said brake means thereby releasing the braking force and for reducing and controlling the pressure of the pressurized fluid directed into said brake means in response to action of said means driven by rotation of said carrier.

2. The hoisting winch as claimed in claim 1, wherein said means driven by said carrier comprises a conventional type hydraulic pump having a shaft, a connection plate fixedly secured to the inner periphery of said carrier, a transmission shaft connected by spline at one end thereof with the center of said connection plate, a first gear fixedly secured to the other end of said transmission shaft, and a second gear engaged with said first gear and fixedly mounted on said shaft.

3. The hoisting winch as claimed in claim 1, wherein said adjustable pressure reducing valve means comprises a spool valve having a bore, valve spool means in said bore, an inlet port connected with the passage for the pressurized fluid delivered by said hydraulic pump, and an outlet port connected with the passage for brake releasing pressurized fluid, said valve spool means having therein a pressure reducing control chamber, a load piston housed in said chamber to reduce or control the pressure of the brake releasing pressurized fluid, and a pilot passage for introducing the pressurized fluid into said pressure reducing control chamber, a second load piston in said bore abutting said valve spool means subject to the action of said means driven by said carrier, and a manually operable adjustable pressure reducing load spring means mounted on the opposite side of said valve spool means relative to the second load piston so as to adjust the pressure reducing control provided by the brake releasing pressurized fluid.

* * * * *